July 5, 1949.  W. K. CRESON  2,475,222
STEERING GEAR
Filed Nov. 19, 1945
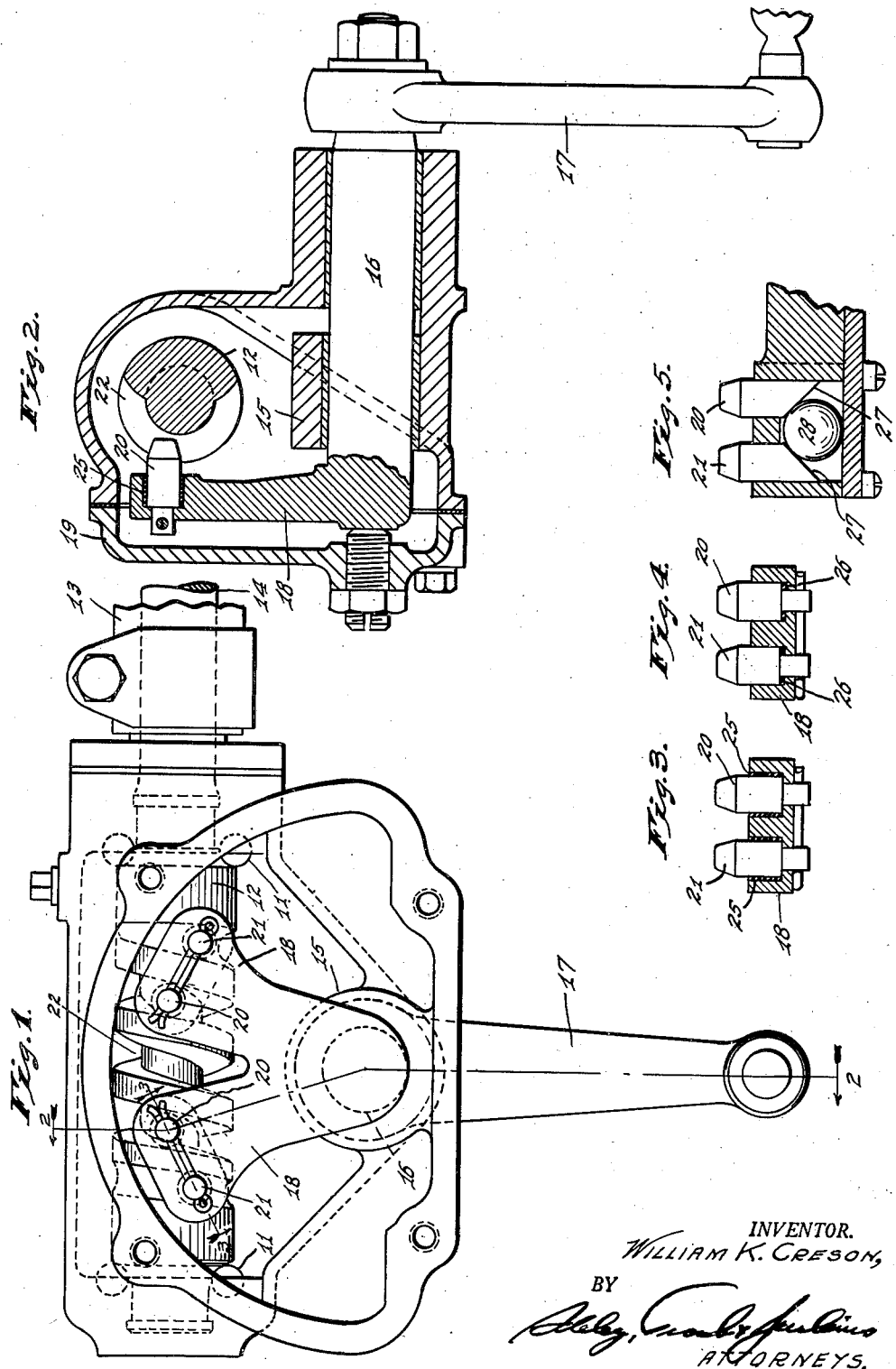
INVENTOR.
WILLIAM K. CRESON,
BY
ATTORNEYS.

Patented July 5, 1949

2,475,222

UNITED STATES PATENT OFFICE 2,475,222

STEERING GEAR

William K. Creson, La Fayette, Ind., assignor to Ross Gear and Tool Company, La Fayette, Ind., a corporation of Indiana Application November 19, 1945, Serial No. 629,442

7 Claims. (Cl. 74—500)

This invention relates to steering gears of the cam and lever type in which a cam rotatable by the steering wheel is provided with a generally helical cam groove which receives a stud mounted on a swinging arm operatively connected to the dirigible wheels of a vehicle.

A factor affecting the over-all dimensions of such a steering gear is the load transmitted between the stud and the side walls of the cam-groove. Both the stud and the helical rib separating adjacent turns of the cam groove must possess certain minimum dimensions in order to enable them safely to transmit the loads which will be imposed upon them in service. When it is desired that the steering gear possess a relatively high mechanical advantage, it frequently is necessary to enlarge the over-all dimensions of the steering gear to an undesirable extent in order that the stud and cam-rib will be adequately strong; for the minimum pitch of the cam groove will be limited by the minimum permissible rib-thickness and by the minimum permissible width of the stud-receiving cam-groove.

It is an object of this invention to provide a steering gear in which relatively high mechanical advantages can be obtained without increasing the over-all dimensions of the steering gear to an undesirable extent. A further object of my invention is to provide a steering gear which, while possessing a relatively high mechanical advantage, will still possess sufficient reversibility at and near the midpoint of its range of adjustment to enable the operator to have a sense of the road reaction on the vehicle wheels and to assist the operator in restoring the dirigible wheels to their normal straight-ahead position.

In carrying out the invention, I employ on the swinging lever a series of studs engaging different turns of the helical cam-groove. Preferably, I employ two pairs of studs so arranged that the angular spacing of the two studs of one pair about the lever-axis will equal the angular spacing of the other pair of studs and will be one-half the angular spacing of the adjacent studs of the two pairs. The cam groove has an effective pitch such that the four studs will span five turns of the helix, to leave the middle one of the five turns free of any stud.

The accompanying drawing illustrates my invention: Fig. 1 is a side elevation of the steering gear with the cover removed; Fig. 2 is a transverse section on the line 2—2 of Fig. 1; Fig. 3 is a section on the line 3—3 of Fig. 1; and Figs. 4 and 5 are sections similar to Fig. 3 illustrating modifications.

The steering gear shown in the drawing comprises a housing provided with bearings 11 which rotatably support a cam member 12. Secured to one side of the housing in line with the axis of the cam member 12 is a steering column 13 surrounding a steering shaft 14 which is operatively connected to the cam 12 in any convenient manner.

Below the cam 12, the housing is provided with a bearing 15 which rotatably receives a rock shaft 16 projecting outwardly from the housing and provided at its outer end with a steering arm 17 adapted for connection in known manner to the dirigible wheels of the vehicle. Within the housing, the rock shaft 16 has rigid with it a pair of arms 18 which project upwardly at one side of the cam 12. Conveniently, the arms 18 are formed integrally with the shaft 16, and the housing 18 is provided with an open side, adapted to be closed by a cover 19 and through which the shaft and arms can be inserted in assembly of the steering gear. Each of the two arms 18 is provided with a pair of studs 20 and 21 which project from the arm and are received in different turns of a generally helical cam-groove 22 provided in the cam 12.

In the preferred embodiment of the invention, the cam groove 22 has a uniform effective pitch—that is, it is so shaped that the ratio between the angle through which the shaft 14 rotates and the angle through which the arms 18 rotate is a constant. The four studs 20 and 21 are mounted at equal distances from the axis of the shaft 16 and are so spaced about such axis that the two studs of each pair will occupy adjacent turns of the groove 22 and that the two studs 20 will occupy alternate turns of such grooves. In the specific construction illustrated, the two studs 20 and 21 of each pair are spaced apart by an angle of 18° about the axis of shaft 16, while the two studs 20 are spaced apart by an angle of 36° about such axis. As a result, the steering gear possesses a mechanical advantage of approximately 20 to 1.

Desirably, the steering gear is so designed that at least two of the four studs will be in engagement with the cam groove throughout the range of adjustment of the shaft 16. As a result, the load transmitted between the cam 12 and the arms 18 will be distributed between at least two of the studs and may be distributed among as many as four. Because of this distribution of the load, the studs may be materially smaller than if one stud had to transmit the entire load. By making the studs smaller, the width of the cam groove 22 may be decreased and the width, and hence the strength, of the rib separating groove-turns may be increased. Since, for any given disposition of the axes of the cam 12 and shaft 16 increasing the mechanical advantage of the steering gear is accompanied by decreased spacing of adjacent turns of the cam groove and by decreased thickness of the rib between adjacent groove-turns, it is obvious that by distributing the load among a plurality of studs the over-all dimensions of the steering gear may be materially reduced.

To accommodate for inevitable manufacturing inaccuracies, it may be desirable to provide for limited relative movement of the studs 20 and 21. Several means for accomplishing this result are illustrated in the drawings. In the construction illustrated in Fig. 3, each stud is supported in its associated arm 13 through the medium of a bushing 25 of some resilient material, such as rubber. With such an arrangement, should any stud, as a result of manufacturing inaccuracies, be subject to a load greater than that transmitted by other studs, its associated bushing 25 would yield and would in large part relieve such stud of its excess load.

Where the groove-engaging portions of the studs 20 and 21 are frusto-conical, as is preferred, the reaction of the side wall of the cam groove upon the stud will have a component longitudinally thereof. In such an arrangement, the equalizing structure illustrated in Fig. 4 may be employed. There, the axes of the studs are positively held in relatively fixed positions, but each stud has associated with it at its outer end a resilient pad 26 which, by yielding, can permit outward movement of the stud under excessive load.

In the structure illustrated in Fig. 5, the frusto-conical studs are freely slidable axially of themselves in the associated arm 18, adjacent faces of the studs are beveled as indicated at 27, and between such beveled faces there is mounted a floating thrust member 28, preferably a ball. As will be obvious, the inclined faces 27 and the ball 28 cooperate to equalize axial thrust on the two pins 20 and 21 of each pair, thus equalizing the tangential effort transmitted to such studs by the cam.

The absence of a stud spaced equidistant between the two studs 20 in the unoccupied center turn of the cam groove increases the reversibility of the steering gear.

It will be apparent from Fig. 1 that at each of the outer studs the angle between the normal to the cam groove and the line joining the center of the stud with the center of the rock shaft 16 is less than the corresponding angle at each inner stud and that each such latter angle is in turn less than would be a corresponding angle at a stud located in the center turn of the cam groove midway between the inner studs. This illustrates the fact that as any stud moves away from a position adjacent the center of the cam 12, the angle between the cam-reaction upon it and the line drawn from its center to the center of shaft 16 decreases. The effectiveness of cam-reaction in tending to rotate the rock shaft 16 will be less when exerted on a stud near the end of the cam than when exerted on a stud near the center of the cam; for the lever arm of the cam-reaction will be less in the case of a stud near the end of the cam than in the case of a stud near the middle of the cam. It follows from this that when an exterior torque is applied to the shaft 16 by transmission of road-reaction to the arm 17, cam-reaction applied to a stud near the end of the cam is less effective in opposing rotation of the rock shaft than would the same cam-reaction applied to a stud near the center of the cam.

The arms 18 and the studs they bear are shown in Fig. 1 in the positions they occupy when the dirigible wheels of the vehicle are in the straight-ahead position toward which, in most vehicles, road-reaction biases them. In such condition the total cam-reaction is distributed among studs located at distances from the center of the cam, and consequently is relatively ineffective in opposing movement of dirigible vehicle wheels to the straight-ahead position toward which the road-reaction biases them. It is for this reason that I omit a stud from the position midway between the inner studs 20; for the portion of total cam reaction applied to such a stud would be relatively effective in opposing rotation of the rock-shaft under the influence of road reaction transmitted to it. In other words, by omitting a stud which would lie in the center turn of the cam groove when the dirigible wheels of the vehicle are straight-ahead, I have increased the reversibility of the steering gear, when near the mid-point of its range of adustment, thereby decreasing the resistance which the steering gear offers to the return of the dirigible wheels to their straight-ahead position after having been displaced therefrom, and increasing the driver's "feel" or sense of reactions on the dirigible wheels.

I claim as my invention:

1. In a steering gear, a housing, a cam rotatably supported in said housing and adapted for connection to a steering shaft, a rock shaft supported in said housing on an axis spaced from the axis of the cam and disposed in a plane transverse to the axis of said cam, said rock shaft being adapted for connection to dirigible vehicle wheels, said cam being provided with a generally helical cam groove, two pairs of studs supported from said rock shaft and movable therewith, said two pairs of studs being disposed near opposite ends of said cam when the rock shaft is near the midpoint of its range of adjustment with the two studs of each pair received in adjacent turns of said cam groove and with at least one turn of said cam groove intervening between the two innermost studs.

2. In a steering gear, a housing, a cam rotatably supported in said housing and adapted for connection to a steering shaft, a rock shaft supported in said housing on an axis spaced from the axis of the cam and disposed in a plane transverse to the axis of said cam, said rock shaft being adapted for connection to dirigible vehicle wheels, said cam being provided with a generally helical cam groove, a stud supported from said rock shaft and movable therewith, said stud being received in said cam groove whereby rotation of said cam will cause angular movement of said rock shaft, said groove being so shaped that the ratio of angular movement of said rock shaft to the extent of rotation of said cam is a constant throughout the range of rock-shaft adjustment, and a second stud supported from said rock shaft and movable therewith, said two studs being disposed at equal distances from the axis of said rock shaft and in adjacent turns of said groove, said studs being closely received in their respective turns whereby rotation of said cam in either direction will cause the application to both studs of forces tending to rotate the rock shaft.

3. In a steering gear, a housing, a cam rotatably supported in said housing and adapted for connection to a steering shaft, a rock shaft supported in said housing on an axis spaced from the axis of the cam and disposed in a plane transverse to the axis of said cam, said rock shaft being adapted for connection to dirigible vehicle wheels, said cam being provided with a generally helical cam groove, a stud supported from said rock shaft and movable therewith, said stud being received in said cam groove whereby rotation of said cam will cause angular movement of said rock shaft, said groove being so shaped that the ratio of angular movement of said rock shaft to the extent of rotation of said cam is a constant throughout the range of rock-shaft adjustment, and a second stud supported from said rock shaft and movable therewith, said two studs being disposed at equal distances from the axis of said rock shaft and so spaced angularly about said axis as to be received in said groove near opposite ends of the cam when the rock shaft is near the midpoint of its range of adjustment, said studs being closely received in their respective turns whereby rotation of said cam in either direction will cause the application to both studs of forces tending to rotate the rock shaft.

4. In a steering gear, a housing, a cam rotatably supported in said housing and adapted for connection to a steering shaft, a rock shaft supported in said housing on an axis spaced from the axis of the cam and disposed in a plane transverse to the axis of said cam, said rock shaft being adapted for connection to dirigible vehicle wheels, said cam being provided with a generally helical cam groove, a stud supported from said rock shaft and movable therewith, said stud being received in said cam groove whereby rotation of said cam will cause angular movement of said rock shaft, said groove being so shaped that the ratio of angular movement of said rock shaft to the extent of rotation of said cam is a constant throughout the range of rock-shaft adjustment, and a second stud supported from said rock shaft and movable therewith, said two studs being disposed at equal distances from the axis of said rock shaft and in different turns of said groove, said studs being closely received in their respective turns whereby rotation of said cam in either direction will cause the application to both studs of forces tending to rotate the rock shaft.

5. The invention set forth in claim 4 with the addition that said studs are capable of a limited relative angular movement about the axis of said rock shaft, and resilient means opposing such relative stud-movement.

6. The invention set forth in claim 4 with the addition said cam-groove has outwardly diverging side walls, said studs being tapered at their ends complementarily to the divergence of said groove-walls and being supported from said rock shaft for relative longitudinal movement, and resilient means opposing such stud-movement.

7. The invention set forth in claim 4 with the addition said cam-groove has outwardly diverging side walls, said studs being tapered at their ends complementarily to the divergence of said groove-walls and being supported from said rock shaft for independent movement toward and away from said cam, and means operatively interconnecting said studs for causing one to move toward the cam when the other moves away from the cam.

WILLIAM K. CRESON.

REFERENCES CITED

The following references are of record in the file of this patent:

UNITED STATES PATENTS

| Number | Name | Date |
|---|---|---|
| 1,120,096 | Sizaire | Dec. 8, 1914 |
| 2,071,235 | Newman | Feb. 16, 1937 |
| 2,154,055 | Schurr | Apr. 11, 1939 |